J. H. PRESS AND I. F. AVERY.
VEHICLE BODY.
APPLICATION FILED OCT. 16, 1920.
1,425,541.
Patented Aug. 15, 1922.
3 SHEETS—SHEET 3.
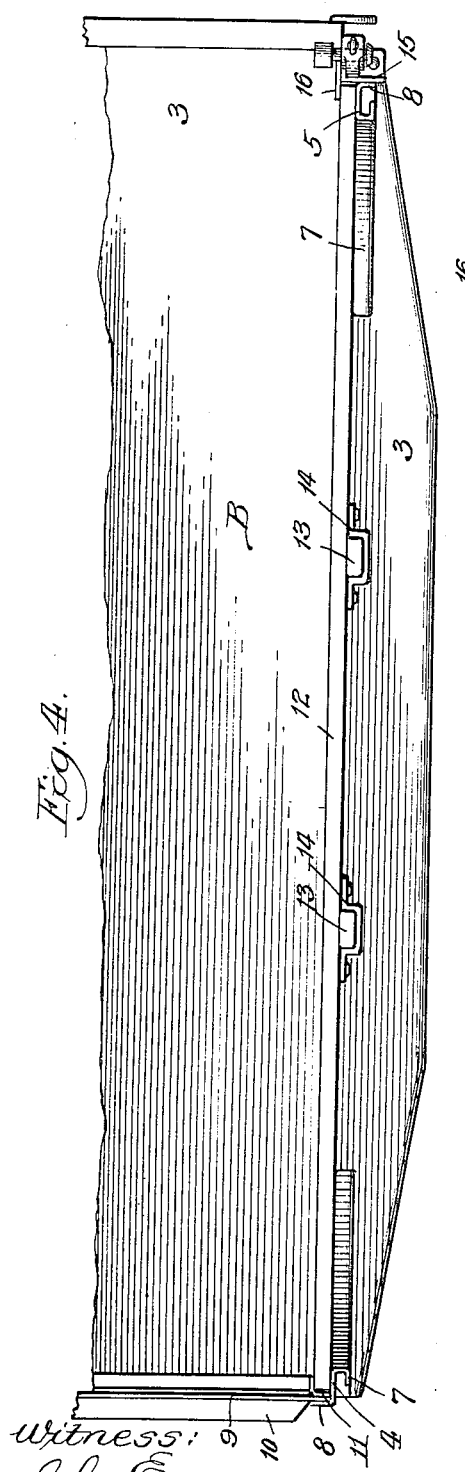
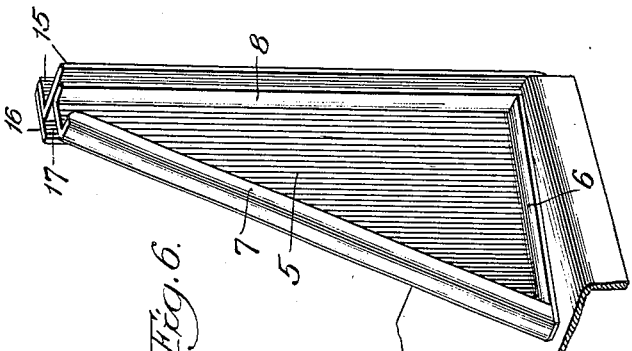
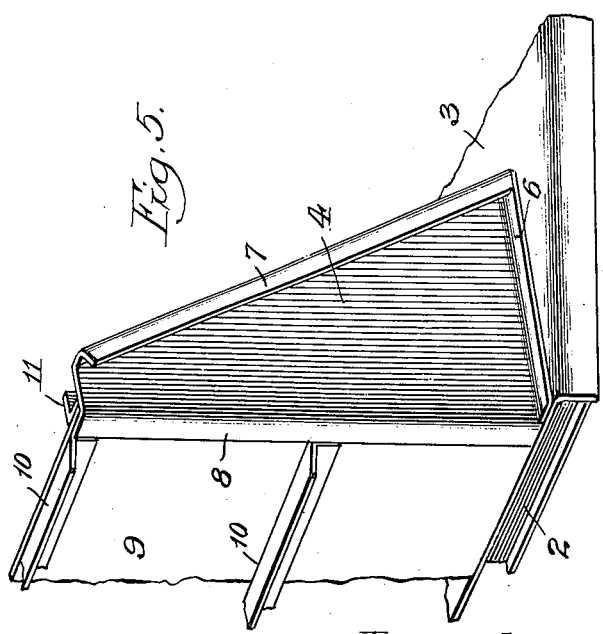

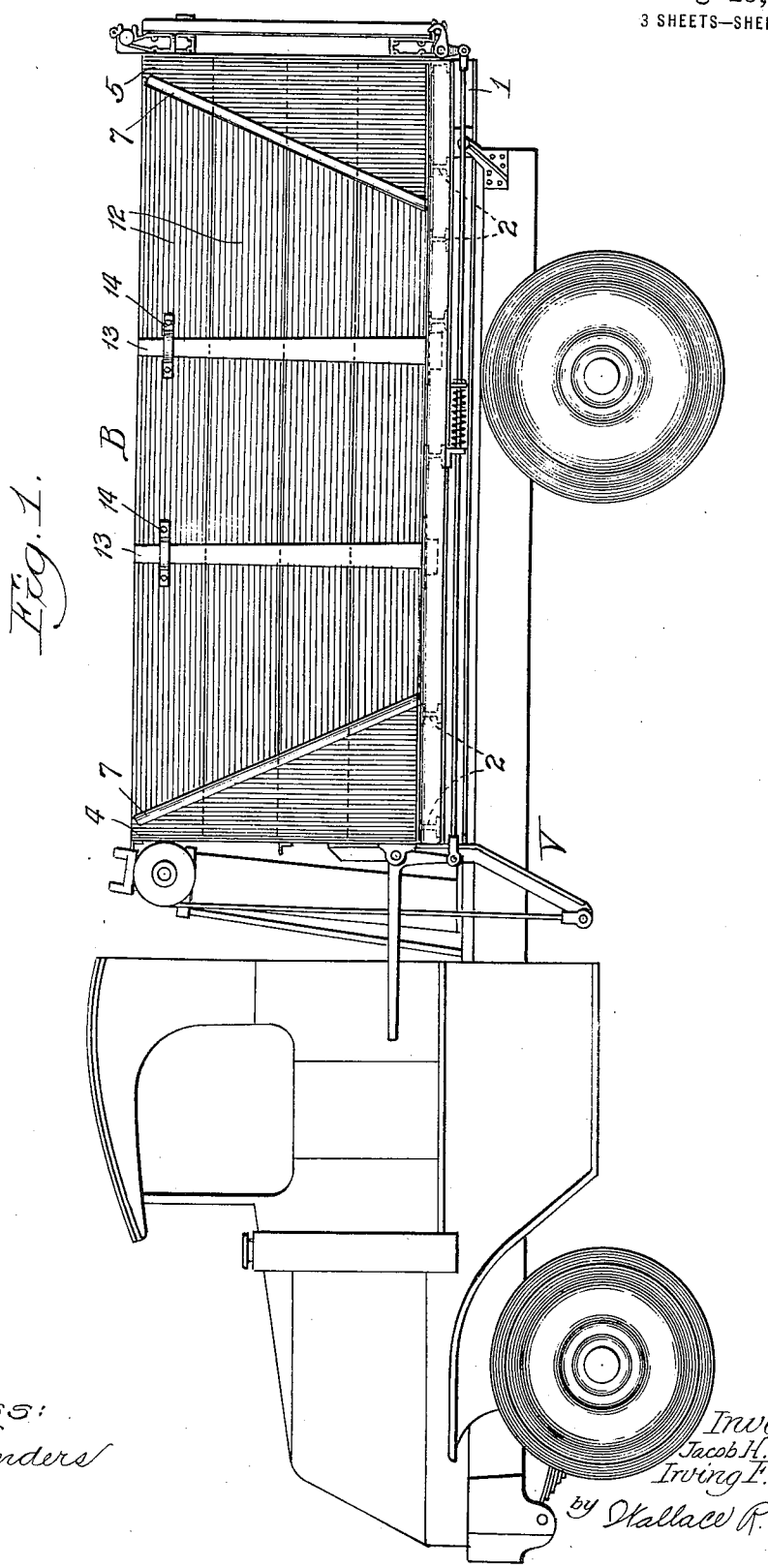

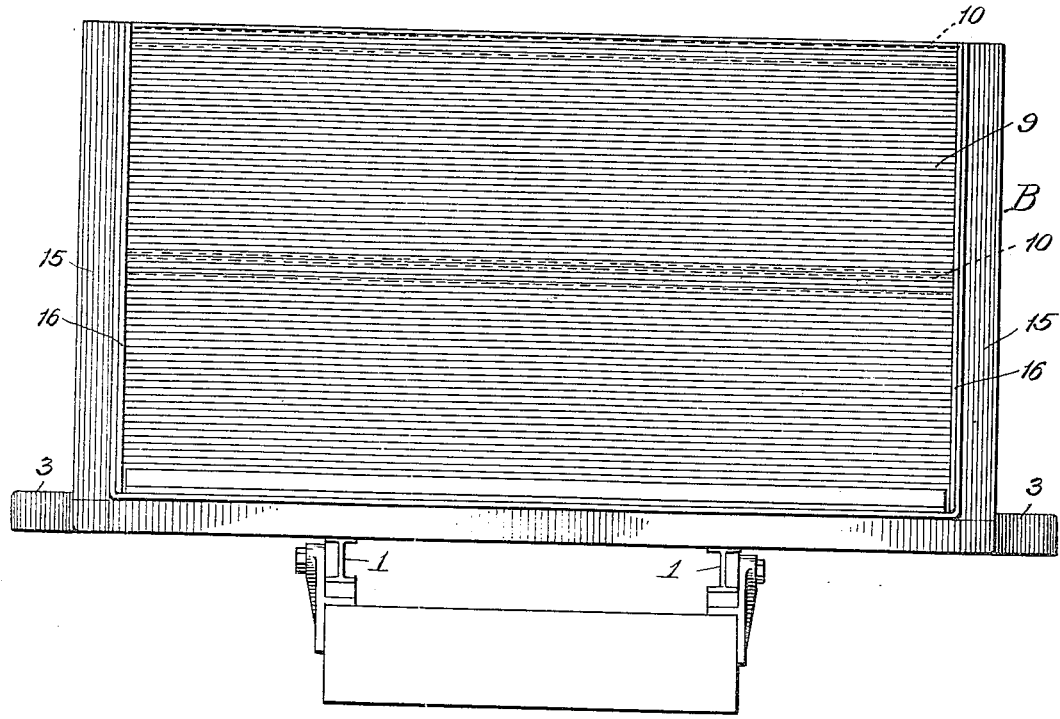
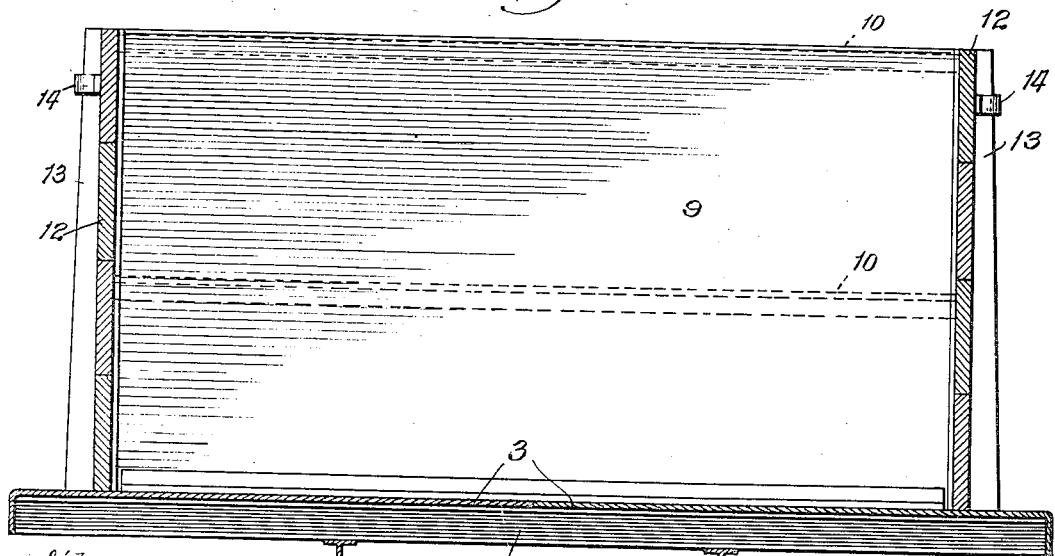

UNITED STATES PATENT OFFICE.

JACOB H. PRESS AND IRVING F. AVERY, OF CHICAGO, ILLINOIS, ASSIGNORS TO JACOB PRESS SONS, OF CHICAGO, ILLINOIS.

VEHICLE BODY.

1,425,541.	Specification of Letters Patent.	Patented Aug. 15, 1922.

Application filed October 16, 1920. Serial No. 417,337.

*To all whom it may concern:*

Be it known that we, JACOB H. PRESS and IRVING F. AVERY, citizens of the United States, residing in the city of Chicago, county of Cook, and State of Illinois, have invented certain new and useful Improvements in Vehicle Bodies, of which the following is a specification.

This invention relates to vehicle bodies, and more especially those adapted for use with automobile trucks and the like, the purpose being to improve upon the construction of such devices. Among our improvements are a new style of box-bed, a new manner of fastening an endgate in position in the box, a new stay member for supporting in position the endgate and sidewalls of the body of the box, a new mode of staying the sides of the box.

Our invention includes such further objects, advantages and capabilities as will later more fully appear, and further resides in the combination, construction, and arrangement of parts illustrated in the accompanying drawings, and while we have shown therein a preferred embodiment we desire the same to be understood as illustrative only and not as limiting our invention.

In the accompanying drawings illustrating this invention, Fig. 1 is a side elevation of an automobile truck having our invention applied thereto, Fig. 2 is a front end elevation of our invention shown in connection with a truck frame, Fig. 3 is a cross-section of the body shown in Fig 1, Fig. 4 is a fragmentary plan view to show the relationship of certain parts of our new structure, Fig. 5 is a perspective view of one of the front corners of a vehicle body constructed in accordance with our invention, and Fig. 6 is a somewhat similar view of a rear corner thereof.

Referring more in detail to the drawings, V represents the vehicle and B the body, or box, thereof, constituting the subject-matter of this present application. Mounted on and secured to the vehicle frame is a pair of longitudinal I-beams upon and secured to which are transverse I-beams, which are adapted to support the bed of the box. This bed consists of one or more plates (3) of sheet metal, having their outer longitudinal edges bent downwardly to cover the ends of the beams (2). The corners of this bed (3) are bent downwardly in such a manner that the outer line thereof makes an angle with the longitudinal axis of the bed, so that the corners do not protrude so far and so sharply as if the entire bed protruded the full distance. This is shown best in Fig. 4. Securely braced at the front and rear corners respectively of this bed are stay members (4 and 5) the shape of which is shown most clearly in Figs. 5 and 6. From these figures it will be evident that a flat body portion wider at one end than at the other, has its wide end bent outwardly to form a flange (6) while one longitudinal margin is bent into trough shape as shown at (7). The other longitudinal margin is bent laterally to form a flange (8), shown in Fig. 5 as extending inwardly and in Fig. 6 outwardly, member 4 being provided with the inwardly extending flange 8 and member 5 with the outwardly extending one. The flange (6) is secured to the bed (3) adjacent the corner thereof, with the body portion of the stay member extending substantially parallel with the axis of the bed. Resting on the forward end of the bed (3) and secured to the flange (8) of the stay members (4) is an endgate (9), which is provided with reenforcing angle members (10). An angle member (11) is secured to the endgate (9) within the corner formed between the endgate and the stay member (4). This forms a channel within which one end of the body side may slide, to be held in position. Figs. 1 and 3 of the present drawings show these side-boards as consisting of boards or planks (12) but other suitable material might be used. Mounted in apertures in the bed member (3) are side stays (13) which serve to hold the planks (12) from yielding laterally under pressure from within. The upper ends of these stay members (13) pass through loops (14) secured to the upper plank, thereby holding the parts more rigidly in place.

Flanges (6) of the rear stay members are secured to the bedplates (3) as in the case of the stay members (4). Secured to the flange (8) of this stay member is an angle member (15) to the longitudinal flange of which is secured a plate (16) forming a channel (17) corresponding to the channel between angle iron (11) and stay member (4). This channel has the same function as that previously referred to and further description thereof is, therefore, unnecessary. Secured to the same flange of angle iron (15) as is plate (16) are the supporting members for the rear endgate, the construction of which is described and claimed in a co-pending application of one of the present applicants.

It is, of course, understood that the specific description of structure set forth above may be departed from without departing from the spirit of our invention as set forth in this specification and the appended claims.

Having now described this invention, we claim:

1. In a vehicle body, a frame, a box having a bottom resting on and secured to said frame, upwardly extending corner stays secured to the bottom adjacent its corners, an endgate at the forward end of the box, the stays at the forward corners having inwardly extending flanges to which the ends of the endgate are secured, and angle members having one side of the angle secured to the inner face of the endgate and having the other side of the angle projecting inwardly of the box substantially parallel to the body of the corner stays to co-operate therewith to support the sidewalls of the box.

2. In a vehicle body, a stay member comprising a substantially flat body portion having one end bent at substantially a right angle thereto, a longitudinal margin being bent at substantially a right angle to the body portion, and to the bent end, said longitudinal margin being bent to the opposite side of the body portion from the end portion, and the second longitudinal margin being bent into a trough shape to reenforce the stay member, the first mentioned marginal portion serving as means for holding an endgate.

In witness whereof, we hereunto subscribe our names to this specification in the presence of two witnesses.

JACOB H. PRESS.
IRVING F. AVERY.

Witnesses:
W. C. DAVEIS,
CHARLES F. VANISH.